United States Patent
Yablokov et al.

(10) Patent No.: US 12,307,265 B2
(45) Date of Patent: May 20, 2025

(54) SYSTEM AND METHOD FOR INSTALLING A PERSONALIZED APPLICATION ON A MOBILE DEVICE

(71) Applicant: AO Kaspersky Lab, Moscow (RU)

(72) Inventors: Victor V. Yablokov, Moscow (RU); Konstantin M. Filatov, Moscow (RU); Alexey P. Komissarov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 333 days.

(21) Appl. No.: 17/883,674

(22) Filed: Aug. 9, 2022

(65) Prior Publication Data
US 2023/0161606 A1     May 25, 2023

(30) Foreign Application Priority Data
Nov. 22, 2021 (RU) ............................. 2021133977

(51) Int. Cl.
*G06F 9/44* (2018.01)
*G06F 9/445* (2018.01)
*G06F 9/451* (2018.01)
*G06F 9/54* (2006.01)

(52) U.S. Cl.
CPC ........ *G06F 9/4451* (2013.01); *G06F 9/44536* (2013.01); *G06F 9/451* (2018.02); *G06F 9/543* (2013.01)

(58) Field of Classification Search
CPC ...................................................... G06F 9/4451
USPC ........................................................ 718/100
See application file for complete search history.

(56) References Cited

U.S. PATENT DOCUMENTS

| 8,631,456 | B2 | 1/2014 | Reisman |
| 10,409,862 | B2 | 9/2019 | Maharajh et al. |
| 2013/0104113 | A1* | 4/2013 | Gupta ............... G06F 8/61 717/169 |

* cited by examiner

*Primary Examiner* — Timothy A Mudrick
(74) *Attorney, Agent, or Firm* — ArentFox Schiff LLP; Michael Fainberg

(57) ABSTRACT

Disclosed herein are systems and methods for installing a personalized application on a mobile device. In one aspect, an exemplary method comprises, identifying an application distribution source by analyzing settings of an operating system of the mobile device that were changed as a result of obtaining an application from the application distribution source, selecting resources for the application that correspond to the identified application distribution source when a resource database from which the selection is being performed contains at least one resource corresponding to the identified application distribution source, creating the personalized application by reconfiguring the application obtained from the application distribution source based on the selected resources, and installing, on the mobile device, the created personalized application.

18 Claims, 3 Drawing Sheets

Fig. 3

SYSTEM AND METHOD FOR INSTALLING A PERSONALIZED APPLICATION ON A MOBILE DEVICE

CROSS REFERENCE TO RELATED APPLICATIONS

The present application claims priority to Russian Patent Application No. 2021133977, filed on Nov. 22, 2021, the entire content of which is incorporated herein by reference.

FIELD OF TECHNOLOGY

The present disclosure relates to the field of creating and distributing mobile device software, e.g., by installing personalized applications, or app, on a mobile device.

BACKGROUND

The rapid development of computer technologies in the last decade and the proliferation of various computing devices (personal computers, laptops, tablets, smartphones, etc.) have become a powerful incentive to use these devices in a variety of areas of activity and for a vast number of tasks (from internet surfing to bank transfers and electronic document management). In parallel with the growth in the number of computing devices, the volume of software running on these devices has also grown.

A paradoxical situation has arisen whereby different computing devices (or different users, or different categories of users) often use almost the same programs from the same producer for different tasks. These programs differ only in minor, "cosmetic" details. For example, two different distributors may distribute the same application with different logos or interface elements, where each application is designed to work on computing devices of different categories of users. This paradoxical situation has led to difficulties in the creation and distribution of software. For example, software providers are forced to spend additional resources (both in terms of time and personnel) to create many modifications of the same application. In addition, these software providers have to spend additional resources to place the modifications that are created on various application distribution sources. Examples of these application distribution sources include, application stores, such as the App Store, Google Play, various cloud services, and the like.

One approach to address the problem described above is to create large distributions that already contain all the necessary modifications of the applications and the resources required by each modification. This approach may allow users to install, on their computing devices, only the modifications they need. Another approach is updating a number of universal applications only with the necessary application components or resources. Each of these approaches have advantages and disadvantages. When the applications are installed on mobile devices, the dislikes of the disadvantages are strongly expressed by users-thereby increasing dissatisfaction.

Therefore, there is a need for a method and a system for improving installations of personalized applications on mobile devices of users.

SUMMARY

Aspects of the disclosure relate to creation and installation of software, more specifically, to systems and methods of installing personalized applications on mobile devices.

In one exemplary aspect, a method is provided for installing a personalized application on a mobile device, the method comprising: identifying an application distribution source by analyzing settings of an operating system of the mobile device that were changed as a result of obtaining an application from the application distribution source, selecting resources for the application that correspond to the identified application distribution source when a resource database from which the selection is being performed contains at least one resource corresponding to the identified application distribution source, creating the personalized application by reconfiguring the application obtained from the application distribution source based on the selected resources, and installing, on the mobile device, the created personalized application.

In one aspect, the settings of the operating system of the mobile device comprises at least contents of a clipboard.

In one aspect, the settings of the operating system of the mobile device are changed using an external link to the application.

In one aspect, the external link is created in advance via an intermediate service, wherein the intermediate service performs redirection to the application distribution source.

In one aspect, the intermediate service provides data on the application distribution source via at least one of: an application programming interface provided by an application store; and a clipboard of the mobile device of on which the personalized application is to be installed. In one aspect, the resources for the application characterize at least one of: multimedia elements of the application; and a functionality of the application.

In one aspect, the resources for the application comprise at least one of: multimedia data; text strings; licenses; scripts describing a functionality of the application; and modules providing a functionality of the application.

In one aspect, when the resource database from which the selecting of the resources for the application is performed does not contain any resources corresponding to the identified application distribution source, selecting, from the resource database, resources that correspond to a default build of the application.

In one aspect, the resource database is part of a distribution of the application obtained from the application distribution source.

In one aspect, the resource database comprises a remote service where the resources are selected by at least one of: an update to the application obtained from the application distribution source; and a direct download.

According to one aspect of the disclosure, a system is provided for installing a personalized application on a mobile device, the system comprising a hardware processor configured to: identify an application distribution source by analyzing settings of an operating system of the mobile device that were changed as a result of obtaining an application from the application distribution source, select resources for the application that correspond to the identified application distribution source when a resource database from which the selection is being performed contains at least one resource corresponding to the identified application distribution source, create the personalized application by reconfiguring the application obtained from the application distribution source based on the selected resources, and install, on the mobile device, the created personalized application.

In one exemplary aspect, a non-transitory computer-readable medium is provided storing a set of instructions thereon for installing a personalized application on a mobile device, wherein the set of instructions comprises instructions for: identifying an application distribution source by analyzing settings of an operating system of the mobile device that were changed as a result of obtaining an application from the application distribution source, selecting resources for the application that correspond to the identified application distribution source when a resource database from which the selection is being performed contains at least one resource corresponding to the identified application distribution source, creating the personalized application by reconfiguring the application obtained from the application distribution source based on the selected resources, and installing, on the mobile device, the created personalized application.

The method and system of the present disclosure are designed to enable creation and installation of an application on a mobile device of a user, in a more optimal and effective manner, ensuring that the application is personalized, wherein the installation is dependent on the distribution source.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for installing a personalized application on a mobile device in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The following terminologies and concepts are provided in order to clearly present the aspects of the present disclosure.

Personalization of an application (can also be understood as customization of an application) refers to the individualization of products at a request of a specific consumer, e.g., by making structural or design changes. The structural or design changes may be made during final stages of a production cycle. An example of personalization is a change to the application interface according to a target group to which a user of the application belongs. For example, the application may be personalized for a target group that chose a trial version of the application. In another example, the application may be for a target group chose a paid version of the application that may include a more comprehensive functionality, or may include options for further personalization of the application.

A personalized (customized) application refers to an application on which personalization (customization) has been implemented. That is, a personalized application refers to an application that is created at a request of a particular consumer by making structural, design or functional changes.

An application distribution source refers to a service or data repository that provides a selected application to a mobile device of a user. The selected application is provided to the mobile device on demand. In one aspect, providing the application to the mobile device of the user comprises installing the application on the mobile device of the user from an installation file, or building the application on the mobile device of the user from an intermediate module. One example of an application distribution source is application store (app store), such as Google Play app, App Store app, etc.

An installation of an application on a mobile device refers to a set of actions that include at least deploying the application on the mobile device and configuring the operating system settings for the operation of said application on the mobile device. In one aspect, the deploying the application on the mobile device comprises downloading the application onto the mobile device or creating the application from elements provided by other applications, such as an application installer or application distribution source.

Figure 1:
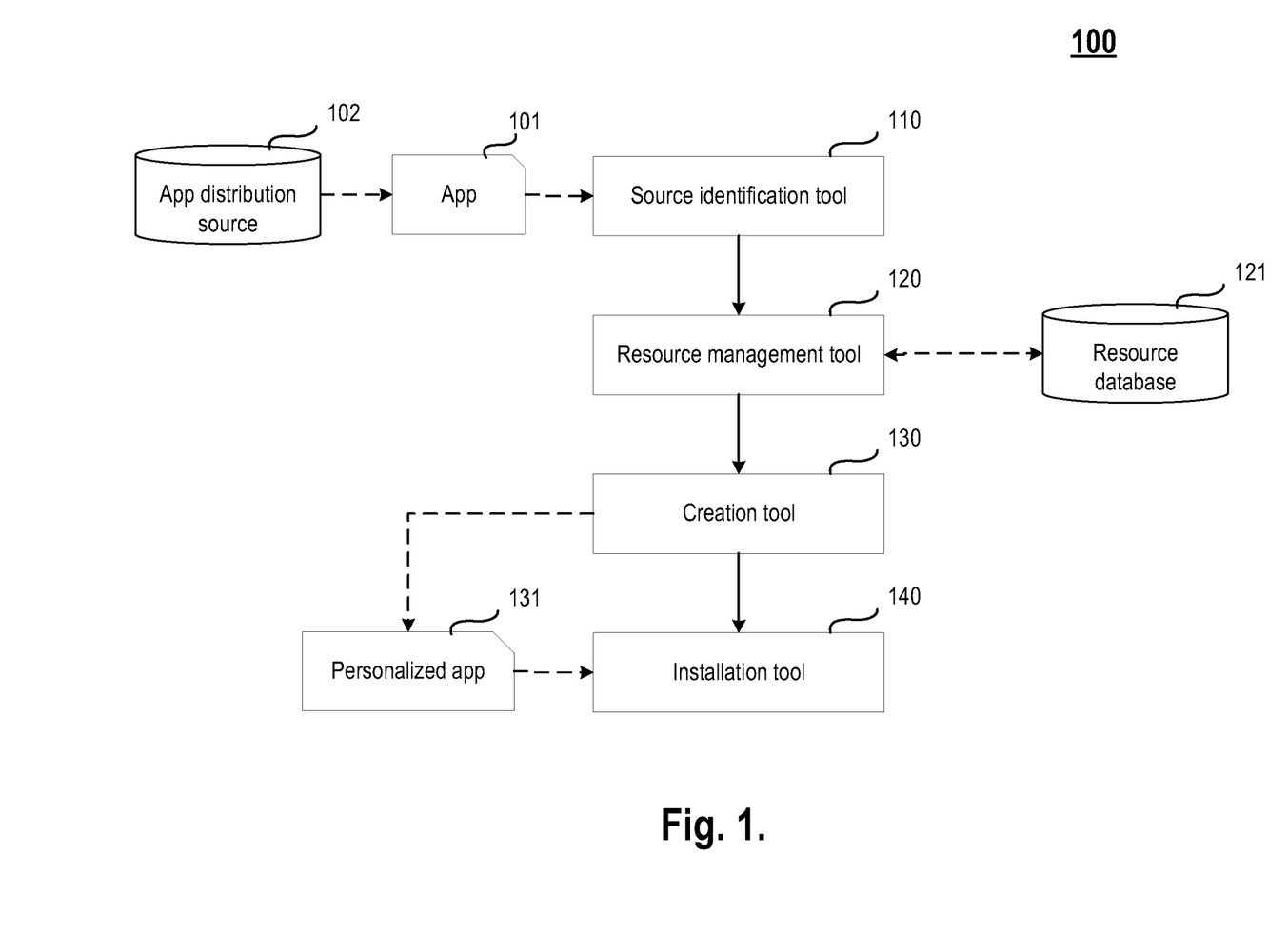
FIG. 1 illustrates a block diagram of an exemplary system for installing a personalized application on a mobile device in accordance with aspects of the present disclosure.

FIG. 1 a block diagram of an exemplary system 100 for installing a personalized application on a mobile device in accordance with aspects of the present disclosure.

The block diagram of the system 100 for installing a personalized application on a mobile device consists of an application distribution source 102, an application 101, a source identification tool 110, a resource management tool 120, a resource database 121, a creation tool 130, a personalized application 131, and an installation tool 140.

Figure 3:
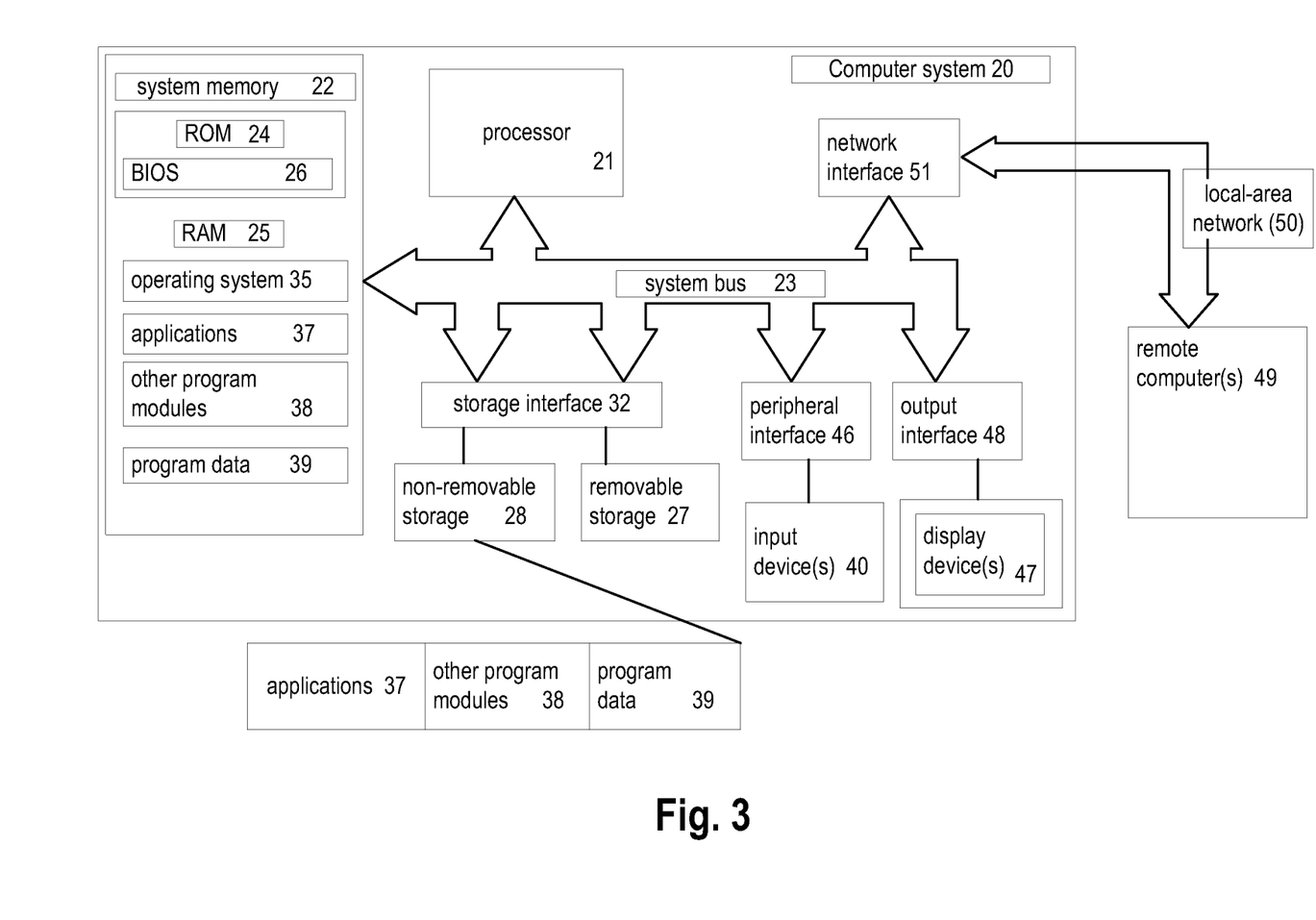
FIG. 3 presents an example of a general purpose computer system on which aspects of the present disclosure can be implemented.

The source identification tool 110, the resource management tool 120, the creation tool 130, and the installation tool 140 are executed on a processor, using its memory, and can be implemented as elements of a computer system or a set of computer systems described in more detail in FIG. 3.

The application distribution source 102 comprises at least:
a repository directly on the mobile device itself, wherein the application 101 may also take the form of an application distribution;
a server containing an application 101 designed for downloading onto a mobile device, where access to the server is granted via an application store, wherein the application store can provide an infrastructure which includes an application that runs on a mobile device and interacts with an external service; and
a server, on which the site is located from which the application 101 is downloaded to the mobile device.

Some examples of possible application stores include: the application store (App Store) which is designed for providing products intended for iPhone mobile devices, Google Play which is designed for providing applications intended for mobile devices running under Android, and the like.

In one aspect, the application distribution source 102 consists of a site that is purely an intermediate node between the mobile device of the user on which the personalized application 131 will be installed and the server on which the application 101 is stored (or the service that provides the application 101), from which the personalized application 131 will later be created. This site is additionally designed to change the operating system settings of the mobile device, as described below.

The application 101 comprises a mobile application, wherein said application can be designed for different categories of users, which in turn may require said application to provide a different functionality or external appearance. The external appearance may include a different interface.

The source identification tool 110 is designed to identify the application distribution source 102 by analyzing the settings of the mobile device operating system that have changed as a result of obtaining the application 101 from the application distribution source 102. That is, in the process of downloading and/or installing the application 101 on the mobile device, the settings of the mobile device operating system are changed, wherein such changes depend on the application distribution source 102.

In one aspect, the modified operating system settings include at least one of:
- contents of the operating system clipboard;
- amount of RAM used or the amount of free RAM;
- data about the services running on the mobile device; and
- settings that describe an internet connection and characterize the operation of a browser (which includes such items as home page URL, favorites, bookmarks, cookies, security settings, telephone connections and proxy settings).

In one aspect, a change to settings of the operating system is implemented depending on the application distribution source 102 at least:
- when installing the application 101 (for example, using a special installer application); and
- due to the way in which applications (such as a browser application) work in the operating system when the settings of the mobile device operating system are changed, such as when downloading the application 101. For instance, the last download address may be recorded in the browser history.

For example, when an application is installed from Google Play, the corresponding installer application sends a notification to the operating system indicating that it is downloading and installing the application. In this way, the application 101 and the application distribution source 102 can be uniquely linked.

In one aspect, the settings of the operating system include at least settings for contents of a clipboard.

For example, when deploying the application 101 on a mobile device using a special installer program or using a browser (if the application 101 was deployed on the mobile device by downloading the application 101 from a website), information is recorded. The recorded information characterizes the application distribution source 102 and is in the form of at least:
- an identifier of the application distribution source 102; and
- resources required to create the personalized application 131.

Once the application 101 is deployed on the mobile device and launched, said application 101 reads the information from the clipboard and performs the creation of the personalized application 131. In one aspect, the resource management tool 120, the creation tool 130 and the installation tool 140 partially implement the functionality of said application 101.

In another aspect, the settings of the operating system are changed via an external link to the application 101. To implement this functionality, an intermediate site between the mobile device and the application distribution source 102 may be used. In one aspect, the application 101 is located directly on the application distribution source 102, and the download and installation of the application are carried out by accessing the link to the intermediate site in the browser. The intermediate site redirects the request to download the application 101 to the application distribution source 102. The application distribution source 102 may be another site or another remote service. In one aspect, the redirection is opaque to the user. Additionally, in one aspect, the download and installation of the application are carried out by running a JavaScript (script) that changes the settings of the operating system of the mobile device to which said application 101 is downloaded, for example, by writing, to the clipboard, information describing the application distribution source 102.

In another aspect, the external link to the mobile application 101 is created in advance by means of an intermediate service, which additionally performs the redirection to the application source 102.

That is, if the application is not distributed via an application store and is not installed on the mobile device using specialized applications, it can be distributed via regular sites as links. In this aspect, the application 101 may be located on one site, and the links to said application 101 may be either direct or via other sites (i.e., when the link leads to a third-party site from which redirection is then carried out, in a manner opaque to the user, via a direct link to the site on which said application 101 is actually located).

When the application 101 is downloaded from different sites, the distribution of the application 101 may be treated as a distribution of different applications. Hence, different personalized applications 131 may be created.

In another aspect, the intermediate service provides data on the application distribution source 102 via at least:
- an Application Programming Interface (API) provided by the application store; and.
- the clipboard of the user's mobile device on which the corresponding application 101 will be installed.

The resource management tool 120 is designed to select, from the resource database 121, resources for the application 101 that correspond to the application distribution source 102 identified using the source identification tool 110, where the resources at least:
- correspond to multimedia elements of the personalized application 131, and/or
- specify the functionality of the personalized application 131 (that is, describe which functions should be implemented how and when, during operation of the application and how the application interacts with the user or other apps, services, etc.).

In one aspect, a resource consists of at least one of:
- multimedia data (for example, graphical themes for the app);
- words, lexemes, text blocks (for example, as text strings);
- licenses (as files, raw data, etc.);
- scripts describing the functionality of the personalized application 131; and
- modules that provide the functionality of the personalized application 131.

For example, the multimedia data may consist of the images used to create the interface for the personalized application 131.

In another example, the scripts describing the functionality of the personalized application 131 may be rules for user interaction with the interface of the personalized application 131.

In another aspect, if the resource database 121 does not contain any resources corresponding to the identified application distribution source 102, the resource management tool 120 is used to select, from the resource database 121, the resources corresponding to a default build for the application.

For example, the resource database 121 may contain graphical themes for the personalized application 131-unique themes for applications distributed by multiple partners, and a universal theme for an application obtained by users from other sources.

In another aspect, the resources with which the resource database 121 operates are stored directly in the distribution of the application that is obtained from the application distribution source 102.

For example, the resource database 121 maybe itself a resource (for example, a packaged data archive) that is contained within the application 101.

In another example, the resource database 121 may contain an image resource for interface elements of the personalized application 131, which is contained within the application 101 and the images of which are selected using the resource management tool 120 depending on the application distribution source 102.

In another aspect, the resource database 121 may be a server that provides a remote service, wherein the resource management tool 120 selects the resources in at least one of the following ways:
   using an update for the application 101 obtained from the application distribution source 102; and
   via direct download.

The creation tool 130 is designed to create the personalized application 131 by reconfiguring an application 101 obtained from the application distribution source 102 based on the resources selected using the resource management tool 120.

Obtaining the application 101 from the application distribution source 102 consists at least one of:
   downloading and then installing the application 101;
   obtaining an update to the application 101 or personalized application 131 (including an update to the resource database 121); and
   downloading and then executing the distribution of the personalized application 131.

Moreover, in one aspect, the reconfiguration of the application 101 to create the resulting personalized application 131 comprises building the personalized application 131 using the modules (components) and the resources of the application 101.

In one aspect, building the personalized application 131 comprises:
   creating the personalized application 131 using the distribution of the application 101, in which case the distribution of the application 101 contains modules that said distribution installs on the mobile device and between which said distribution creates links, thereby building said personalized application 131; and
   recompiling the application 101 to obtain the personalized application 131, disabling or enabling modules of said application.

In one aspect, the personalized application 131 may be created by creating the resources of the application 101 to which said application has access.

In one aspect, creating the resources of the application 101 comprises:

generating resources based on other resources (for example, generating some images from other images, extracting images from other images (so-called "slicing")); and extracting resources from other resources (for example, if a resource for the application 101 is an archive containing the resources of the personalized application 131).

In another aspect, the personalized application 131 is created by building said personalized application from components of the application 101.

In yet another aspect, the personalized application 131 may be created on the application distribution source 102. In this scenario, the creation tool 130 runs on the application distribution source 102.

For example, a personalized application 131 distributed through the Google Play application store may be created by said service using the provided SDK ("software development kit").

In another aspect, the personalized application 131 is created after the application 101 is installed on the mobile device and launched for the first time, wherein the application 101 includes at least the resource management tool 120 and the creation tool 130. In this aspect, after the installed application 101 is launched for the first time, the creation tool 130, based on the information about the application distribution source 102, creates the available resources and configures the functionality, thus creating the personalized application 131.

The installation tool 140 is designed to install the personalized application 131, created using the creation tool 130, on the mobile device.

In one aspect, the installation of a personalized application 131 refers to a set of actions that result in:
   the personalized application 131 being deployed on the mobile device, i.e. placement of the files necessary for its operation on the mobile device;
   the initial configuration of the deployed personalized application 131 in such a way that it can perform the stated functionality after launch; and
   the installation or modification of operating system settings that will be used by the personalized application 131 while it is running.

It may thus be the case that when the personalized application 131 is already located on the mobile device, the personalized application 131 is launched but not yet configured. The configuration can be carried out after the personalized application 131 is first launched. In this scenario, it is assumed that the installation of the personalized application 131 (final installation) has not yet been carried out.

During the configuration process of a personalized application 131 launched for the first time, at least the following tasks may be performed:
   creating the resources for the personalized application 131;
   updating the personalized application 131; and
   changing the settings of the operating system.

Thus, in one aspect, the personalized application 131 may be an application 101 that was configured after it was deployed on the mobile device and after it was first launched.

Figure 2:
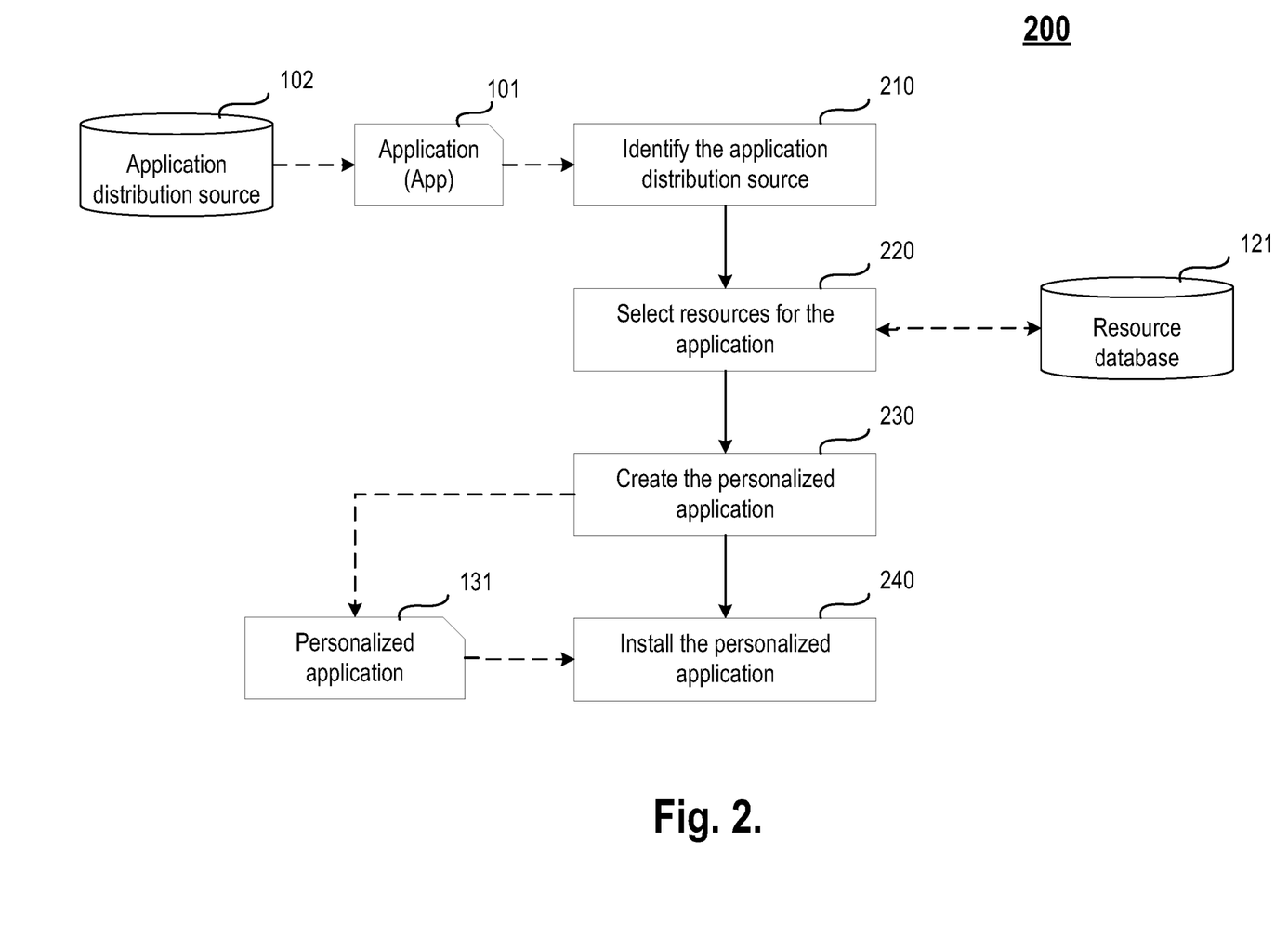
FIG. 2 illustrates a method for installing a personalized application on a mobile device in accordance with aspects of the present disclosure.

FIG. 2 illustrates a method 200 for installing a personalized application on a mobile device in accordance with aspects of the present disclosure. The tools described in conjunction with FIG. 1 are used to implement the steps of method 200.

In step 210, by the source identification tool 110, method 200 identifies an application distribution source by analyzing settings of an operating system of the mobile device that were changed as a result of obtaining the application from the application distribution source.

In one aspect, the settings of the operating system includes at least a setting for contents of a clipboard.

In one aspect, the settings of the operating system may be changed via an external link to the application.

In one aspect, the external link to the application may be created in advance using an intermediate service, wherein the intermediate service additionally performs a redirection to the application distribution source 102.

In one aspect, the intermediate service provides data on the application distribution source 102 via at least one of:
an API provided by an application store; and.
the clipboard of the mobile device of the user on which the corresponding application is to be installed.

In step 220, by the resource management tool 120, method 200 selects from a resource database 121 resources for the application that correspond to application distribution sources identified in step 210.

In one aspect, the resources characterize at least one of:
a multimedia element of the application; and
a functionality of the application.

In one aspect, a resource comprises at least:
multimedia data;
text strings;
licenses;
scripts that describe the functionality of the application; and
modules that provide the functionality of the application.

In one aspect, when the resource database 121 does not contain any resources to the identified application distribution source 102, method 200 selects, from the resource database 121, resources corresponding to a default build for the application. Thus, when a resource database from which the selection is being performed contains at least one resource corresponding to the identified application distribution source, the method selects the at least one resource. Otherwise, the resources corresponding to a default build for the application are selected.

In step 230, by the creation tool 130, method 200 creates the personalized application by reconfiguring the application obtained from the application distribution source based on the resources selected in step 220.

In one aspect, the resource database 121 is part of the distribution of the application obtained from the distribution source for the application 101.

In one aspect, the resource database 121 is a remote service, wherein the resources are selected by at least one of:
updating the application 101 obtained from the application distribution source 102; and
direct download.

In step 240, by the installation tool 140, method 200 installs on the mobile device the personalized application created in step 230.

FIG. 3 is a block diagram illustrating a computer system 20 on which aspects of systems and methods for installing a personalized application on a mobile device may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for installing a personalized application on a mobile device, the method comprising:

obtaining, by the mobile device, an application from an application distribution source;

identifying the application distribution source by analyzing settings of an operating system of the mobile device that were changed as a result of obtaining the application from the application distribution source, wherein the settings of the operating system of the mobile device include at least contents of a clipboard that describe the application distribution source;

selecting resources for the application that correspond to the identified application distribution source when a resource database from which the selection is being performed contains at least one resource corresponding to the identified application distribution source;

creating, on the mobile device, the personalized application by reconfiguring the application obtained from the application distribution source based on the selected resources; and installing, on the mobile device, the created personalized application.

2. The method of claim 1, wherein the settings of the operating system of the mobile device are changed using an external link to the application.

3. The method of claim 2, wherein the external link is created in advance via an intermediate service, wherein the intermediate service performs redirection to the application distribution source.

4. The method of claim 3, wherein the intermediate service provides data on the application distribution source via at least one of:

an application programming interface provided by an application store; and a clipboard of the mobile device of on which the personalized application is to be installed.

5. The method of claim 1, wherein the resources for the application characterize at least one of:

multimedia elements of the application; and a functionality of the application.

6. The method of claim 1, wherein the resources for the application comprise at least one of:

multimedia data;

text strings;

licenses;

scripts describing a functionality of the application; and modules providing a functionality of the application.

7. The method of claim 1, further comprising:

when the resource database from which the selecting of the resources for the application is performed does not contain any resources corresponding to the identified application distribution source, selecting, from the resource database, resources that correspond to a default build of the application.

8. The method of claim 1, wherein the resource database is part of a distribution of the application obtained from the application distribution source.

9. The method of claim 1, wherein the resource database comprises a remote service where the resources are selected by at least one of:

an update to the application obtained from the application distribution source; and a direct download.

10. A system for installing a personalized application on a mobile device, comprising:

at least one processor of the mobile device configured to:

obtain an application from an application distribution source;

identify the application distribution source by analyzing settings of an operating system of the mobile device that were changed as a result of obtaining the application from the application distribution source, wherein the settings of the operating system of the mobile device include at least contents of a clipboard that describe the application distribution source;

select resources for the application that correspond to the identified application distribution source when a resource database from which the selection is being performed contains at least one resource corresponding to the identified application distribution source;

create, on the mobile device, the personalized application by reconfiguring the application obtained from the application distribution source based on the selected resources; and install, on the mobile device, the created personalized application.

11. The system of claim 10, wherein the settings of the operating system of the mobile device are changed using an external link to the application.

12. The system of claim 11, wherein the external link is created in advance via an intermediate service, wherein the intermediate service performs redirection to the application distribution source.

13. The system of claim 12, wherein the intermediate service provides data on the application distribution source via at least one of:

an application programming interface provided by an application store; and a clipboard of the mobile device of on which the personalized application is to be installed.

14. The system of claim 10, wherein the resources for the application characterize at least one of:

multimedia elements of the application; and a functionality of the application.

15. The system of claim 10, wherein the resources for the application comprise at least one of:

multimedia data;

text strings;

licenses;

scripts describing a functionality of the application; and modules providing a functionality of the application.

16. The system of claim 10, the processor further configured to:

when the resource database from which the selecting of the resources for the application is performed does not contain any resources corresponding to the identified application distribution source, select, from the resource database, resources that correspond to a default build of the application.

17. The system of claim 10, wherein the resource database is part of a distribution of the application obtained from the application distribution source.

18. A non-transitory computer readable medium storing thereon computer executable instructions for installing a personalized application on a mobile device, including instructions for:

obtaining, by the mobile device, an application from an application distribution source;

identifying the application distribution source by analyzing settings of an operating system of the mobile device that were changed as a result of obtaining the application from the application distribution source, wherein the settings of the operating system of the mobile device include at least contents of a clipboard that describe the application distribution source;

selecting resources for the application that correspond to the identified application distribution source when a resource database from which the selection is being performed contains at least one resource corresponding to the identified application distribution source;

creating, on the mobile device, the personalized application by reconfiguring the application obtained from the application distribution source based on the selected resources; and installing, on the mobile device, the created personalized application.

* * * * *